Nov. 6, 1962        H. E. SINGLETON        3,062,059

ACCELERATION MEASURING SYSTEM

Filed Feb. 4, 1957        3 Sheets-Sheet 1

INVENTOR:
Henry E. Singleton

Attorney

INVENTOR:
Henry E. Singleton

Attorney 3,062,059
ACCELERATION MEASURING SYSTEM
Henry E. Singleton, Downey, Calif., assignor, by mesne assignments, to Litton Industries, Inc., Beverly Hills, Calif., a corporation of Delaware
Filed Feb. 4, 1957, Ser. No. 638,028
11 Claims. (Cl. 73—517)

This invention relates to an acceleration measuring system, and more particularly to a precision accelerometer which is torqued by constant current signals in a null-restoring direction in response to accelerations sensed thereby.

In recent years a great amount of effort has been directed toward the development of inertial and celestial navigation systems, especially for the guidance of aircraft and missiles. In most of these systems there are employed two or more accelerometers which are mounted on a stabilized platform whose attitude with respect to either earth or inertial space is controlled by associated gyros or celestial instruments, the accelerometers being utilized to generate signals representative of changes in the position of the platform in space. In general there are three basic forms of accelerometers which may be so utilized, namely, simple accelerometers which are operative to generate output signals representative of the magnitude and polarity of acceleration components applied thereto along a sensitive axis, integrating accelerometers or velocity meters which are operative to generate output signals representative of the magnitude and direction of the velocity of the device along a sensitive axis, and double integrating accelerometers or position meters which are operative to generate output signals representative of the position of the device along the coordinate represented by its sensitive axis. For purposes of simplicity and clarity, the utility and applicability of the invention will be disclosed with reference to simple accelerometers in particular, although it is to be understood that the basic concept is also applicable to the other forms of accelerometers, as for example in entering correction signals.

In its most basic form a simple accelerometer comprises a mass which is moveable in response to accelerations applied along a sensitive axis, and a sensing circuit for detecting movements of the mass to thereby measure the force or torque applied thereto by accelerations of interest. In its more sophisticated forms the mass is frequently suspended as a pendulum unit, and a servo loop is closed between the pick-off or sensing unit and an associated torquer unit which applies a counterbalancing force or torque to the mass to thereby maintain the mass at substantially its null position. Either the output signal from the sensing circuit or the torquer signal may then be monitored to provide the desired output signal representative of the accelerations applied to the device.

In the accelerometers of the prior art it has been customary to torque the accelerometer to its null position by utilizing a variable D.C. electrical current whose polarity is such as to drive the mass in a restoring direction and whose amplitude is directly proportional to the magnitude of the acceleration sensed so as to maintain as precisely as practicable the accelerometer's null position. Although accelerometers utilizing this form of torquing technique have been found to operate reasonably well, they have several serious disadvantages which inherently restrict their accuracy and range, especially in precise navigational systems wherein it is frequently necessary to measure accelerations accurately over ranges extending from as low as $10^{-5}g$ to $10g$, where $g$ is the acceleration of gravity.

More particularly, if a variable direct current signal whose magnitude varies directly with the applied acceleration is employed to energize the torquer of an accelerometer which is operative over so extensive a range, it follows that the torque-applying element within the accelerometer must be linear over the entire range of the torquing signal to counteract precisely the torques created by accelerations of interest. Moreover, in order to measure accelerations as low as $10^{-5}g$ it is essential that the effect of frictional forces, such as those in the bearings, for example, be minimized. This can be done by employing a mass with appreciable pendulosity, but to do so requires that the current delivered to the torquer must be increased concomitantly. Owing to the foregoing requirements that the torquers be both highly linear and have a high power handling capacity, the torquers utilized in the prior art accelerometers have been of necessity relatively large, thereby severely limiting the minimum size of the accelerometers and consequently restricting the size and weight of the stabilized platform on which it is mounted.

Still another serious disadvantage of the prior art accelerometers is the fact that the amount of power delivered to the torquers is continuously variable owing to the fact that the flight pattern of the vehicle carrying the stabilized platform may vary from violent aerobatics to smooth level flight at a constant velocity. Inasmuch as at least a portion of the energy delivered to the torquer is dissipated as heat energy within the accelerometer, it will be recognized that the temperature of the accelerometer will vary as a function of the accelerations sensed by the accelerometer. These temperature variations in turn create differential expansion or contraction of the elements within the accelerometer which invariably affect the accuracy and calibration of the device.

The present invention, on the other hand, provides precision acceleration measuring systems which obviate the above and other disadvantages of the prior art systems and permit the utilization of highly miniaturized accelerometers which provide even greater accuracy than their relatively massive counterparts in the prior art. According to the basic concept of the invention the accelerometers employed in the acceleration measuring systems herein disclosed are torqued continuously by constant current signals of equal amplitude and opposite polarity, or in other words by the relatively high and low level voltages of a bilevel or square wave signal, the system being responsive to an applied acceleration to vary the ratio of the intervals through which currents of each polarity are applied to thereby produce a net torque on the accelerometer's mass while simultaneously maintaining constant the input power to the device. Inasmuch as the input power is maintained constant, it is clear that the accelerometer will be maintained at a constant equilibrium temperature, thereby eliminating temperature variations as a function of the accelerations sensed by the instrument. Moreover, the utilization of constant magnitude torquing currents eliminates the need for extremely linear torquers and thereby permits the employment of torquers which are extremely small in size and which are more easily designed.

In accordance with the preferred form of the invention, the relatively high and low levels of a bilevel or square wave signal are employed as the equal magnitude current signals which are utilized to torque the accelerometer, the square wave signal being generated by a variable square wave signal generator which is responsive to the signals developed by the accelerometer's pick-off or sensing unit to vary the mark-space ratio of the square wave signal or in other words, the ratio of the high level period of the square wave signal to the low level period of the signal. Consequently the net current delivered to the torquer to null balance the accelerometer's moveable mass is a measure of the applied acceleration, or stated differently, the average value of the square wave signal, as provided for example by a low pass filter, is representative of the applied acceleration.

As hereinafter disclosed in detail, the square wave signal generator may produce either an asynchronous square wave signal whose mark-space ratio is variable, a fixed frequency signal whose mark-space ratio is variable, or a train of signals each having a fixed period where either a high level signal or a low level signal is presented during each signal period, the average value of the signals occurring over a given interval representing the applied acceleration over the interval. It will be recognized, therefore, that the structure of the variable square wave generator may take any of several different forms, as for example a Schmidt trigger circuit, an overdriven amplifier and limiter combination, a one-shot or monostable multivibrator, or a gated bistable multivibrator, the specfic structure of the square wave generator depending upon which of the above-mentioned types of square wave signal is utilized to convey intelligence in energizing the accelerometer's torquer.

It is, therefore, an object of the invention to provide acceleration sensing systems wherein an accelerometer is torqued by constant or equal magnitude current signals in a null-restoring direction in response to accelerations sensed thereby.

Another object of the invention is to provide miniaturized precision accelerometers by utilizing a variable square wave signal to torque the accelerometer in a null-restoring direction.

A further object of the invention is to provide acceleration sensing systems wherein an accelerometer is torqued in a null-restoring direction by a variable square wave signal to thereby eliminate the necessity for linear torquers in the accelerometer.

Still another object of the invention is to provide torque-balance acceleration sensing systems wherein the power input to the accelerometer is not a function of the accelerations being sensed thereby.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1:
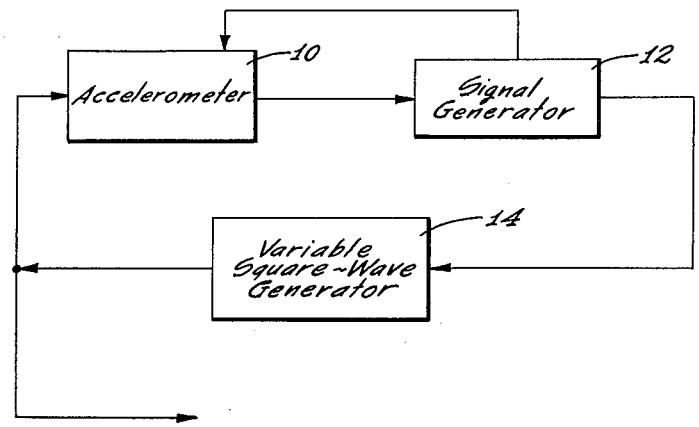
FIG. 1 is a block diagram of an acceleration sensing system, in accordance with the invention, illustrating the basic components thereof.

With reference now to the drawings, wherein like or corresponding parts are designated by the same reference characters throughout the several views, there is shown in FIG. 1 a generic block diagram of the acceleration sensing system of the invention illustrating the basic elements employed therein. As shown in FIG. 1 the system comprises an accelerometer 10 which includes a movable mass for sensing accelerations applied thereto along a predetermined sensing axis, a signal generator 12 which is responsive to movements of the mass for generating electrical output signals representative of the magnitude and polarity of the accelerations sensed by the mass, and a variable square wave generator 14 which is responsive to these electrical signals for generating a square wave signal whose average value is representative of the amplitude and polarity of the applied accelerations. The square wave signal generated thereby is in turn applied to the accelerometer to close a feedback loop for torquing the accelerometer's mass in a null-restoring direction, and in addition, is utilized to provide a system output signal representative of the applied accelerations of interest.

As will be more clearly understood from the description set forth hereinbelow, the square wave signal applied to the accelerometer's torquer is a bilevel signal which swings alternately between a relatively high predetermined voltage and a relatively low predetermined voltage, these voltages being equidistant about a preselected reference voltage which, if applied to the torquer, would generate zero restoring torque upon the accelerometer's moveable mass. For example, if the application of ground potential to the torquer results in no restoring torque being generated within the accelerometer, then the voltage levels of the square wave signal should be of equal magnitude but of opposite polarity with respect to ground potential.

It will be recognized that if the foregoing condition is satisfied, the current supplied to the accelerometer is of substantially constant magnitude but reverses polarity as the square wave signal alternates between its high and low levels and vice versa. Consequently, the power delivered to the accelerometer is substantially constant, assuming of course that the switching time required for a reversal of polarity is relatively short relative to the length of time each high and low level signal is applied to the torquer.

It will also be recognized, however, that if the period of each high level signal and each low level signal is the same, or in other words there is a mark-space ratio of unity, the average current delivered to the torquer will be zero; consequently when no accelerations of interest are being sensed by the accelerometer, the square wave signal generator should generate a signal whose mark-space ratio is unity. On the other hand, when an acceleration of interest is sensed by the accelerometer, an average current not equal to zero must be delivered to the torquer to counterbalance the force created by the acceleration on the accelerometer's movable mass. In accordance with the preferred method of the invention, this is accomplished by increasing the interval through which one signal level is applied to the torquer and concomitantly decreasing the interval through which the other signal level is applied to the torquer, the change in the time of application of each signal being a linear function of the sensed acceleration. It is clear, therefore, that the torquer receives an average current which is directly proportional to the acceleration being sensed, and that the power supplied to the torquer is constant as previously described. It will also be appreciated by those skilled in the electronic art that the average current over a given interval is the average value of the square wave signal over the interval. Accordingly, it will be recognized that an analog output signal representative of the sensed accelerations may be obtained merely by tapping off a portion of the square wave signal through a high impedance and filtering the signal thereby obtained.

Figure 2:
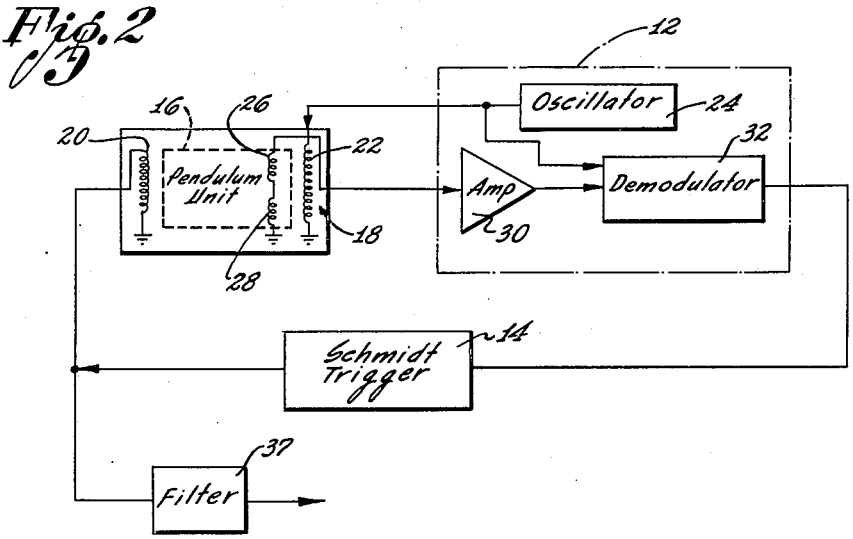
FIG. 2 is a block diagram, partly in schematic form, illustrating one embodiment of the invention which employs a Schmidt trigger circuit as a square wave generator.

With reference now to FIG. 2 there is shown a specific embodiment of the invention illustrating one manner in which the functions of the various system elements shown in FIG. 1 may be mechannized. In this particular embodiment of the invention accelerometer 10 is preferably of the general type shown and described in U.S. Patent 2,995,038 issued August 8, 1961 and filed February 29, 1956 by the present inventor and Harold F. Erdley for a "Precision Torque Balance Accelerometer," and includes a pendulum unit 16 which is moveable in response to accelerations applied along a predetermined sensing axis, a pick-off coil assembly, generally designated 18, for detecting movements of the pendulum, and a torquer coil 20, energizable to apply to the pendulum unit a null-restoring torque for maintaining the pendulum unit in substantially its null position.

As shown diagrammatically in FIG. 2 and in detail in the above-referenced U.S. patent application, pick-off coil assembly 18 in turn includes an energizing winding 22 fixedly mounted in the accelerometer housing and energized from an oscillator 24 within signal generator 12, and a pair of pick-off coils 26 and 28 mounted on the pendulum unit and electrically connected to an amplifier 30 within the signal generator. Pick-off coils 26 and 28 are connected in series aiding and are electromagnetically coupled to energizing winding 22 in a manner such that no output signal is applied to amplifier 30 when the pendulum is in its null position. On the other hand, when the pendulum is rotated from its null position, an alternating current output signal is produced by the pick-off coils, this signal being either in phase or 180° out of phase with respect to the signal received from oscillator 24, depending upon the direction of the sensed acceleration, and having an amplitude proportional to the magnitude of the acceleration being sensed.

Amplifier 30 is preferably an overdriven amplifier or an amplifier and limiter combination which functions to convert the signal received to an output signal whose waveform is roughly a square wave, this output signal being in turn applied to a demodulator 32 within signal generator 10. It will be appreciated that the amplitude of the signals received from the accelerometer need no longer be preserved as an indication of the magnitude of sensed accelerations inasmuch as time is being utilized as the variable for representing acceleration rather than the magnitude of the accelerometer signals.

Demodulator 32 also receives the output signal from oscillator 24, and is preferably a balanced demodulator such as the type employing four crystal rectifiers in a bridge circuit as shown in Figs. 14.24 and following of volume 19 of the Radiation Laboratory Series, published by the McGraw-Hill Book Company of New York, N.Y. The demodulator in turn functions to produce an output signal whose characteristic with respect to the applied accelerations is of the form shown by waveform 34 in FIG. 3, where the abscissa represents the positional displacement of the accelerometer's pendulum unit about the null position and the ordinate represents the magnitude and sign of the demodulator output signal.

The output signal from the demodulator could, if desired, be amplified and clipped and thereafter applied to the accelerometer's torquer coil 20. Although this circuit would perform satisfactorily in some applications, it has one deficiency which limits its use in a high accuracy system, namely, the crossover or switching time required for the output signal to change from its high level to its low level or vice versa is relatively long compared with that obtainable with other forms of waveshaping circuits.

Figure 3:
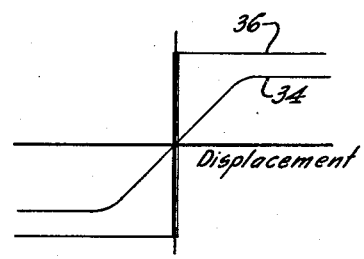
FIG. 3 is a plot of waveforms illustrating the characteristics of signals appearing at various points in the system of FIG. 2.

The particular square wave generator employed in the embodiment of FIG. 2 is a conventional Schmidt trigger circuit having two stable states, the circuit being responsive to the voltage level of the applied input signal for triggering to one conduction state when the input signal rises above a predetermined reference or threshold level, and to the opposite state when the input signal falls below the reference level. A typical circuit of this type is shown in Fig. 9.36 of volume 19 of the aforementioned Radiation Laboratory Series. Owing to the fact that the triggering or switching time of a trigger circuit may be reduced to a fraction of a microsecond, whereas the time required for a complete triggering cycle of the trigger circuit is of the same order of time as the natural resonant frequency of the accelerometer's pendulum unit, it will be appreciated that the time required for the circuit to switch is extremely small compared with the interval through which the circuit remains in one or the other of its stable states. Accordingly the error introduced by the switching time of the trigger circuit is negligibly small. The trigger circuit therefore acts as a variable gain amplifier or waveshaping circuit whose output signal characteristic is shown in FIG. 3 by the waveform 36.

Owing to the fact the power applied to the torquer must be maintained constant regardless of which conduction state the trigger circuit happens to be in, the output signal from the trigger circuit should be clamped at the predetermined high and low level voltages previously discussed with respect to the general description of FIG. 1. It will be recognized by those skilled in the art that this may be accomplished by employing a pair of crystal rectifiers together with regulated sources of high and low level voltages, or if even tighter clamping is desired, by employing a pair of transistors which can be interconnected to more closely approach the characteristic of an ideal diode having infinite reverse impedance and zero forward impedance.

In operation, the system is inherently oscillatory about the accelerometer's null position, the pendulum unit normally receiving an accelerating force of predetermined magnitude and of alternating sense by virtue of the action of to torquer coil. When an external acceleration along the accelerometer's sensitive axis is sensed, therefore, there is an effective increase in the acceleration applied in one direction which is sensed by the pick-off coils and fed back to the accelerometer's torquer by increasing the torquing interval in the direction opposite to that of the sensed acceleration and decreasing the torquing interval in the same direcion, the magnitude of these variations in the normal intervals being a linear function of the magnitude of the sensed accelerations. Accordingly, a direct current output signal representative of the sensed accelerations may be obtained by merely filtering the square wave signal with a low pass filter 37.

Figure 4:
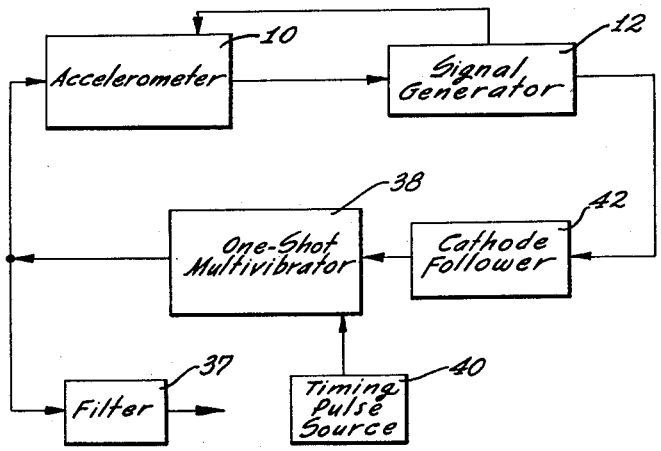
FIG. 4 is a block diagram of still another embodiment of the invention wherein a monostable multivibrator is employed as a variable square wave generator.

It will be recognized by those skilled in the art that numerous other forms of electronic circuits could also be employed in the square wave generator, and that the basic concept of the invention is not to be limited to the use of a trigger or squaring circuit for effectively squaring the demodulator output signal. For example, there is shown in FIG. 4 an embodiment of the invention wherein the square wave generator comprises a monostable or one-shot multivibrator 38 which is periodically set to its astable conduction state by a periodically recurring timing pulse received from a timing pulse source 40, the duration of the astable interval being variable by driving the multivibrator's R.C. timing circuit with the demodulator output signal through a cathode follower 42 which functions as an impedance transformer.

In operation the one-shot multivibrator functions to produce an output signal whose mark-space ratio is unity when the demodulator output signal is at its null position, and to increase or decrease the mark-space ratio as the demodulator output signal varies from its null value in one direction or the other. It should be noted that any non-linearity introduced by the multivibrator's RC timing network will be automatically compensated for by the fact that the multivibrator is part of a closed loop system.

Figure 5:
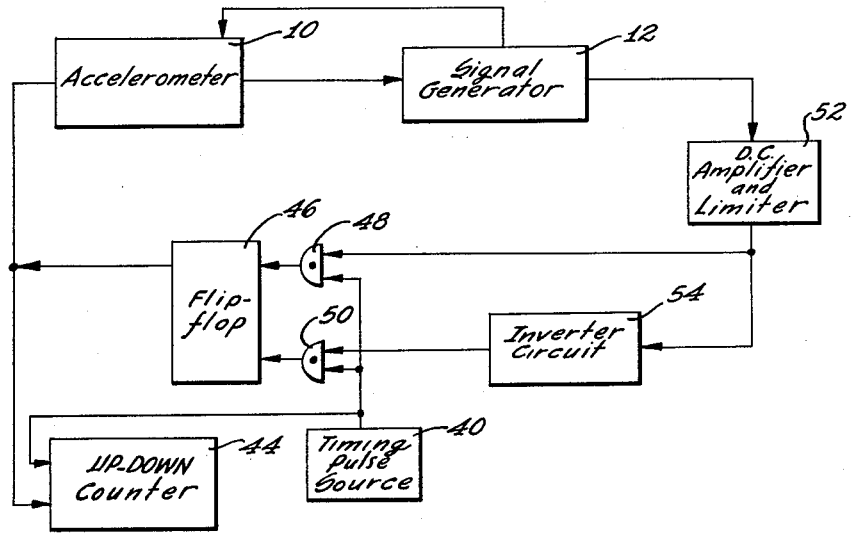
FIG. 5 is a block diagram of another embodiment of the invention which is especially suitable for use with a digital computer.

Referring now to FIG. 5, there is shown still another embodiment of the invention which produces a digitized square signal which may be employed both to torque the accelerometer and to actuate an electronic digital counter 44 to present a digital count representative of velocity. In this embodiment of the invention the square wave generator comprises a flip-flop or bistable multivibrator 46 which is actuable from a pair of "and" gates 48 and 50 to selectively present either a high level output signal or a low level output signal to the accelerometer's torquer. The "and" gates in turn are controlled by the output signal from signal generator 12 through an amplifier and limiter circuit 52, gate 50 further including an inverter circuit 54 in its control circuit. In operation each "and" gate is responsive to a high level control signal to selectively pass a timing signal applied from a source 40 to periodically recurring timing pulses, and to a low level control signal for blocking passage of the pulse. The passage of a pulse by gate 48 is then operable to set the flip-flop to one of its conduction states, while the passage of a pulse by gate 50 functions to set the flip-flop to its other conduction state.

Inasmuch as only one gate is open at a time to pass a pulse owing to the fact that the control signals to the two gates are complementary, and since the flip-flop conduction state can only be reversed by receipt of a timing pulse, it will be recognized that each high and low signal produced by the flip-flop will have a fixed period. Thus in the normal operation of the accelerometer when no acceleration is being sensed, the flip-flop output waveform will vary alternately between its high and low levels at the end of each timing pulse period. Conversely, when an acceleration is sensed the flip-flop output waveform will include two or more high level or low level signals in a row, depending upon the magnitude and polarity of the acceleration being sensed.

It may be shown that the magnitude and polarity of the average value of the accelerations occurring over a given interval, expressed as a fraction of full scale acceleration, is then obtainable by taking the difference between the number of high and low level signals occurring over the interval, and dividing the difference by the total number of signals of both types which have occurred. In a similar manner a digital indication of the increase in velocity over an interval may be obtained by merely summing in a binary counter or accumulator the signals occurring over the interval, each high level signal changing the count by unity in one direction while each low level signal is used to change the count by unity in the other direction.

It should be noted that the bandpass characteristic of the embodiment of the invention shown in FIG. 5 is somewhat limited owing to the fact that intelligence is transmitted by a train of fixed frequency signals each having the same weighting. It should also be noted, however, that other known and existing analog-to-digital conversion techniques could be employed in conjunction with the invention to provide a high bandpass digital output presentation of acceleration. For example, a high frequency electronic counter could be actuated to count high frequency pulses by the start of each mark pulse produced by the square wave generator of FIG. 2, the counter being deactuated or turned off thereafter when the mark pulse ends. Thus the digital count presented at the ends of successive mark pulses would vary linearly with acceleration.

Figure 6:
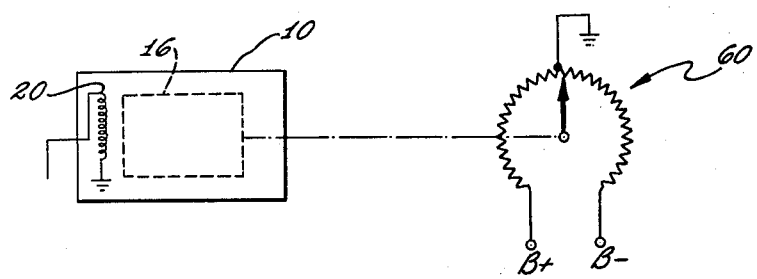
FIGS. 6 and 7 are diagrammatic views of other forms of accelerometers with which the invention may be practiced.
Figure 7:
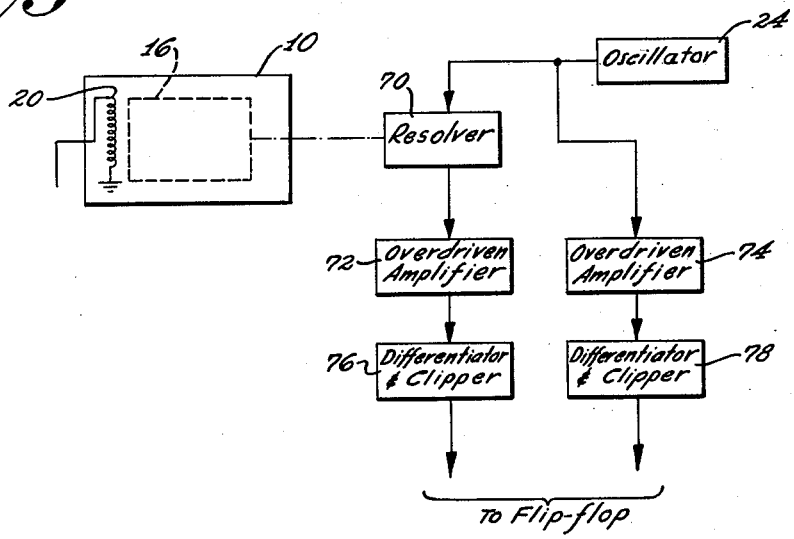

It should also be expressly understood that the present invention is not to be restricted to use with the specific combination of accelerometer and signal generator shown in FIG. 2. For example, there is shown diagrammatically in FIG. 6 an accelerometer 10 which again includes a movable mass 16 and a torquer coil 20, movements of the mass being utilized to vary the setting of a potentiometer 60 which constitutes the associated signal generator. Still another form of signal generator which could be utilized in the acceleration sensing system of the invention is shown in FIG. 7, wherein a resolver 70 is coupled to the movable mass 16 in accelerometer 10 to sense movements thereof. In this particular signal generator the resolver receives an alternating current input signal from an oscillator 24, and produces an output signal at the same frequency but whose phase relative to the oscillator signal varies in accordance with the sensed accelerations. The circuit is completed by a pair of overdriven amplifiers 72 and 74, and a pair of differentiator and clipper circuits 76 and 78, respectively connected in series therewith.

In the operation of this form of signal generator, resolver 70 normally functions to produce an output signal which is 180° out of phase with respect to the oscillator signal when the accelerometer is in its null position; as the accelerometer's mass moves from its null position, therefore, the phase of the output signal is either advanced or retarded, depending upon the direction of the acceleration. Consequently overdriven amplifiers 72 and 74, together with their associated differentiating and clipping circuits function to produce two trains of periodically recurring pulses which are normally 180° out of phase when the accelerometer is null and whose phase relationship varies in accordance with sensed accelerations. Accordingly, the application of these signals to the input terminals of a flip-flop such as that shown in FIG. 5 will function to produce a square wave output signal whose mark period and space period vary conjugally in accordance with the amplitude and polarity of the sensed acceleration.

It is to be understood that still other modifications and alterations may be made in the various elements of FIG. 1 without departing from the spirit and scope of the invention. For example, in FIG. 4 the output signal from signal generator 12 could be utilized to vary the frequency of standard signal source 40 linearly with the sensed accelerations, in which case the square wave signal would have a fixed mark period and a variable space period. It should be emphasized, therefore, that the spirit and scope of the invention are to be limited only by the spirit and scope of the appended claims.

What is claimed as new is:

1. An acceleration sensing system responsive to applied accelerations for producing an electrical output signal representative of the amplitude and polarity of the accelerations, said system comprising: an accelerometer including a mass substantially stationary in a null position, in the absence of applied accelerations, and moveable therefrom in response to applied accelerations, and a torquer unit responsive to an applied torquing signal for applying null-restoring torques to said mass; a signal generator coupled to said accelerometer and responsive to movements of said mass for producing an electrical output signal representative of the magnitude and polarity of accelerations applied to said moveable mass; a square wave signal generator responsive to said output signal for producing a square wave signal having a mark space ratio of unity when said mass is at its null position and a mark space ratio greater than or less than unity when said mass moves from its null position in one direction or the other; and means for applying said square wave signal to said torquer in said accelerometer.

2. An acceleration sensing system responsive to applied accelerations for producing an electrical output signal representative of the amplitude and polarity of the accelerations, said system comprising: a torque-balance accelerometer including a mass stubstantially stationary in a null position, in the absence of applied accelerations, said mass being moveable in two opposing directions in response to accelerations applied along an axis defined by said directions, the direction of movement depending upon the polarity of the acceleration, and a torquer unit responsive to an applied square wave signal for applying torque to said mass, said torquer unit torquing said mass in one direction when said square wave signal is at one of its levels and torquing said mass in the opposite direction when said square wave signal is at the other of its levels; means coupled to said accelerometer and responsive to movements of said mass for producing an electrical output signal representative of the position of said mass relative to its null position; a square wave signal generator coupled to said means and responsive to said output signal for producing a bilevel square wave signal having a mark space ratio of unity when said mass is at its null position and a mark space ratio greater than or less than unity when said mass moves from its null position in one direction or the other; and means for applying said square wave signal to said torquer in said accelerometer.

3. An acceleration sensing system responsive to applied accelerations for producing an electrical output signal representative of the amplitude and polarity of the accelerations, said system comprising: an accelerometer including a mass substantially stationary in a null position in the absence of applied accelerations and moveable therefrom in either direction along a sensitive axis in response to accelerations applied along said axis, and a torquer unit responsive to an applied bilevel signal having first and second predetermined voltage levels for applying torque to said mass, said torquer unit being operable to torque said mass in one direction at a constant rate when said bilevel signal is at said first level and being operable to torque said mass in the opposite direction at said rate when said bilevel signal is at said second level; means coupled to said accelerometer and responsive to movements of said mass for producing an electrical output signal representative of the position of said mass along said axis relative to its null position; a square wave signal generator responsive to said output signal for producing a bilevel square wave signal having said second predetermined level when said mass has moved from its null position in said one direction and said first predetermined level when said mass has moved from its null position in said opposite direction; and means for applying said square wave signal to said torquer in said accelerometer.

4. The acceleration sensing system defined in claim 3 which further includes a low pass filter and means for applying said square wave signal to said filter, said filter being responsive to said square wave signal for averaging said square wave signal to produce a direct current output signal whose amplitude and polarity are representative of the magnitude and polarity of the applied accelerations.

5. The acceleration sensing system defined in claim 3 wherein said first named means produces a variable voltage output signal whose voltage rises above a predetermined reference voltage when said mass is moved from its null position in said one direction and falls below said reference voltage when said mass is moved from its null position in said opposite direction, and wherein said square wave signal generator comprises a Schmidt trigger circuit responsive to said variable voltage signal for producing a square wave output signal having said second predetermined level when said variable voltage signal rises above said reference voltage and said first predetermined level when said variable voltage signal falls below said reference voltage.

6. The acceleration sensing system defined in claim 3 wherein said square wave signal generator comprises a monstable multivibrator having an astable state and a stable state, said multivibrator producing a square wave signal having said first predetermined level when said multivibrator is in its astable state and said second predetermined level when it is in said stable state, means for applying a periodically recurring time pulse signal train to said multivibrator to periodically set said multivibrator to its astable state, and means responsive to said output signal representative of the position of said mass along said axis for varying the astable interval of said multivibrator linearly with the magnitude of accelerations sensed by said mass.

7. The acceleration sensing system defined in claim 3 wherein said square wave generator comprises a bistable multivibrator having first and second conduction states in which a square wave signal having said first and second predetermined voltage levels, respectively, is produced, and means for setting said multivibrator to said second state when said electrical output signal indicates said mass is on said one side of its null position and to said first state when said electrical signal indicates said mass is on said opposite side of its null position.

8. In an acceleration measuring system for producing an electrical output signal representative of the amplitude and polarity of applied accelerations, the combination comprising: an accelerometer including a mass substantially stationary in a null position in the absence of applied accelerations and moveable therefrom in either direction along an axis therethrough in response to accelerations applied along the axis, and a torquer unit responsive to an applied electrical signal for applying torque to said mass; a square wave signal generator selectively actuable to apply to said torquer a high level signal for torquing said mass at a constant rate in one direction or a low level signal for torquing said mass at said constant rate in the other direction; and means responsive to the position of said mass for actuating said square wave signal generator to generate a low level signal when said mass moves from said null position in said one direction and to generate a high level signal when said mass moves from said null position in said opposite direction.

9. In a torque-balance acceleration measuring system for sensing the amplitude and polarity of accelerations applied along a predetermined sensing axis, the combination comprising: an accelerometer including a mass substantially stationary in a null position in the absence of applied accelerations and moveable therefrom in either direction along said predetermined axis in response to accelerations applied along the axis, the direction of movement being determined by the polarity of the applied acceleration, and a torquer unit responsive to an applied electrical signal for applying torque to said mass; a square wave signal generator selectively actuable to apply to said torquer a high level signal for torquing said mass at a constant rate in one direction or a low level signal for torquing said mass at said constant rate in the other direction; and means responsive to the position of said means for actuating said square wave signal generator to generate a low level signal when said mass moves from said null position in said one direction and to generate a high level signal when said mass moves from said null position in said opposite direction whereby the time difference in the periods through which said low and high level signals are applied to said torquer represents the magnitude and polarity of the applied acceleration.

10. An oscillatory acceleration sensing system responsive to applied accelerations for producing an electrical output signal representative of the amplitude and polarity of the accelerations, said system comprising: an accelerometer including a mass normally substantially stationary in a null position and moveable from said null position in either direction along a sensitive axis in response to accelerations applied along said axis, and a bidirectionally energizable torquer unit responsive to an applied electrical signal for selectively applying torque to said mass in either direction along said axis; a square wave signal generator selectively operable to energize said torquer in one direction with a first current of predetermined magnitude or in the other direction with a second current of the same magnitude but of opposite polarity; and means responsive to movements of said mass from its null position for controlling the operation of said square wave signal generator to energize said torquer to drive said mass in a null-restoring direction.

11. The acceleration sensing system defined in claim 10 which further includes an electrical filter circuit coupled to said square wave signal generator for averaging the currents supplied to said torquer to produce a direct current output signal whose amplitude and polarity are representative of the magnitude and polarity of the applied accelerations.

References Cited in the file of this patent

UNITED STATES PATENTS

| | | |
|---|---|---|
| 2,591,921 | Cosgriff et al. | Apr. 8, 1952 |
| 2,846,207 | Marggraf | Aug. 5, 1958 |
| 2,940,306 | Lozier | June 14, 1960 |
| 2,943,493 | ten Bosch et al. | July 5, 1960 |